June 3, 1941.   H. R. HUGHES ET AL   2,244,065
SWITCH CONTROL FOR AIRCRAFT
Filed Dec. 24, 1938   3 Sheets-Sheet 1
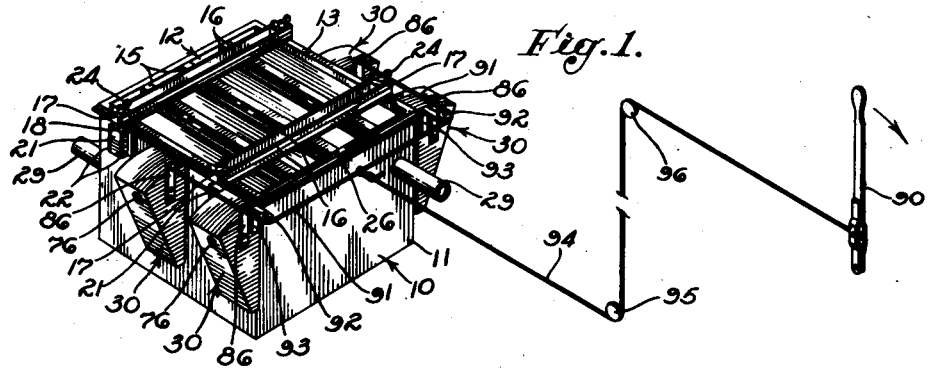
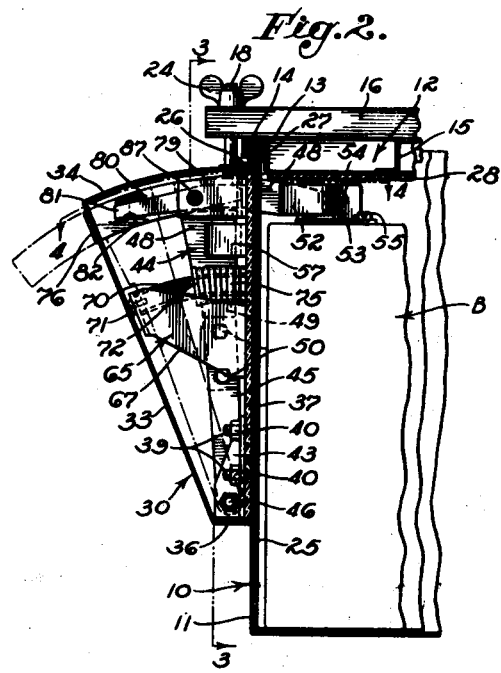
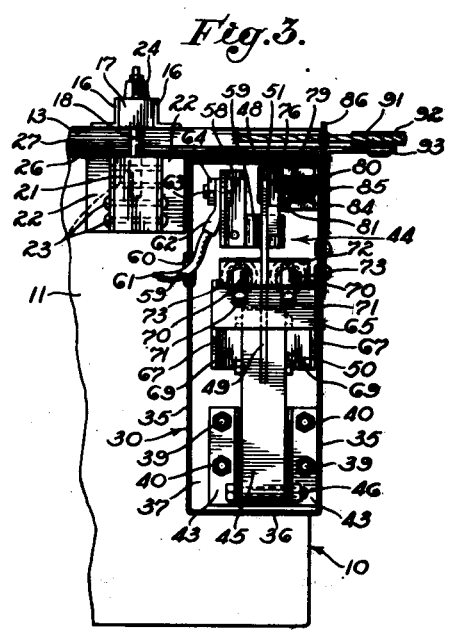
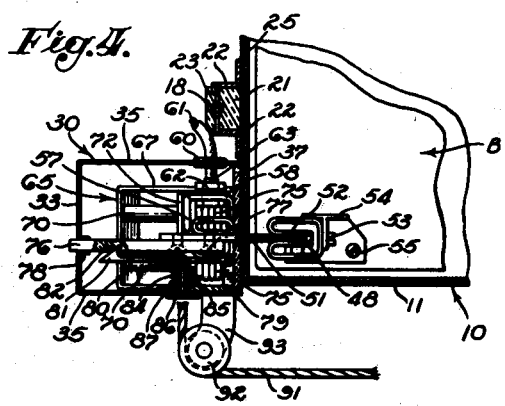
INVENTORS
HOWARD R. HUGHES
RICHARD W. PALMER
WILLIAM L. LEWIS
BY HARRIS, KIECH, FOSTER & HARRIS
FOR THE FIRM
ATTORNEYS

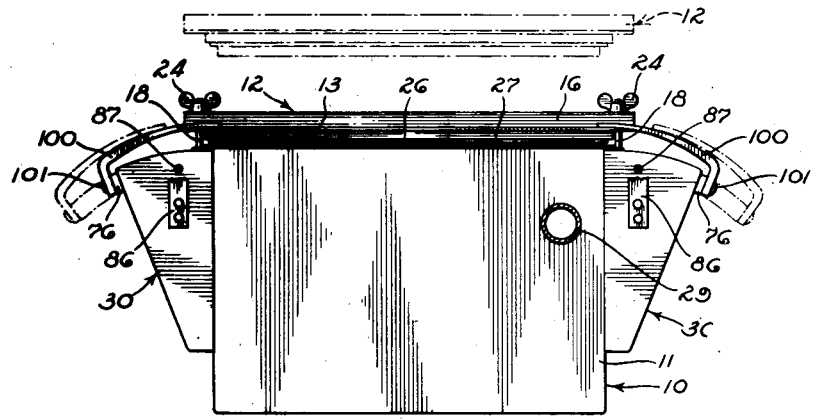
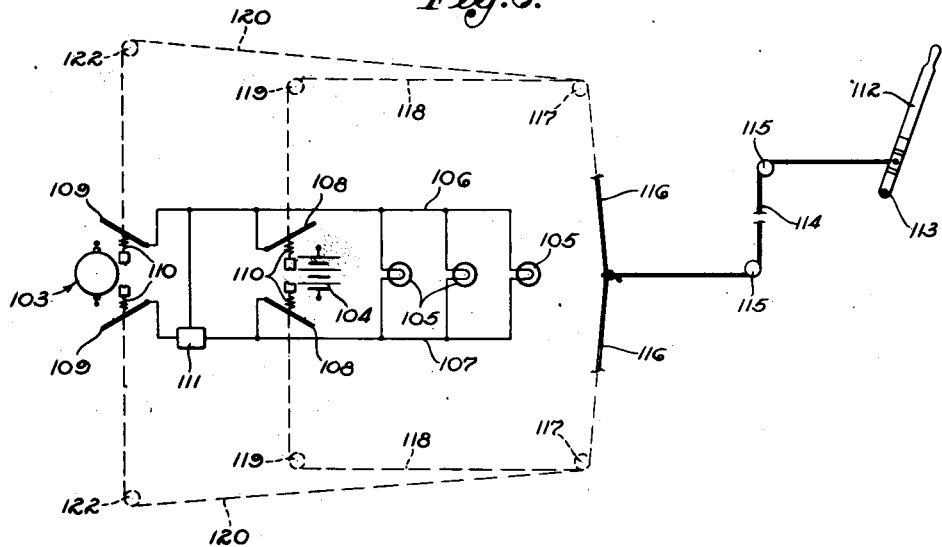

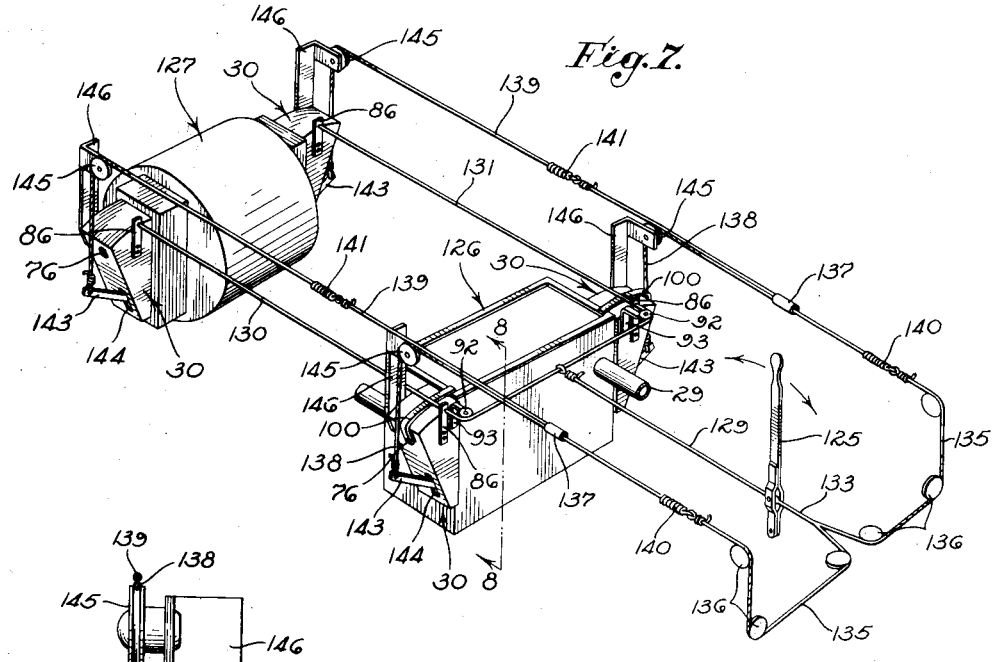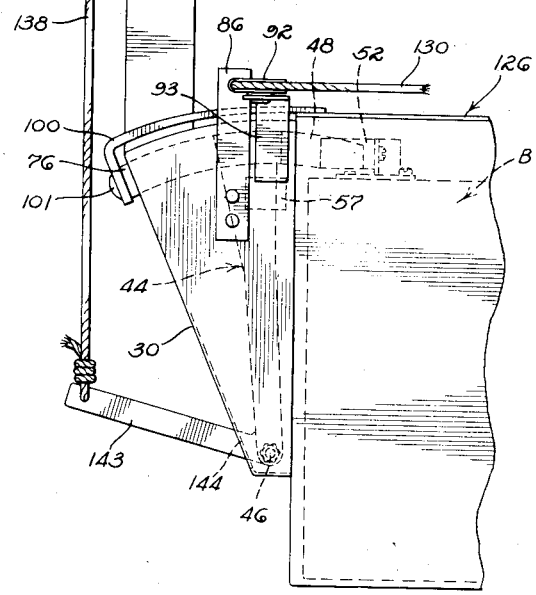

Patented June 3, 1941

2,244,065

UNITED STATES PATENT OFFICE 2,244,065

SWITCH CONTROL FOR AIRCRAFT

Howard R. Hughes, Houston, Tex., and Richard W. Palmer, Pasadena, and William L. Lewis, Glendale, Calif., assignors to Hughes Tool Company, Houston, Tex., a corporation of Delaware Application December 24, 1938, Serial No. 247,716

10 Claims. (Cl. 171—97)

Our invention relates to the electrical art with particular reference to wiring systems, and is directed specifically to a master switching arrangement for completely de-energizing the wiring system.

In the usual wiring arrangement for aircraft vehicles and the like, control switches for de-energizing various circuits serve their purpose, but when such circuits are broken various wires in the circuits are left in communication with the electromotive source and are thereby maintained under electrical potential. The purpose of our invention is to provide a switching means to cut off a wiring system completely at its source, thereby not only de-energizing all the circuits included in the wiring system but also cutting off all the wires and ground connections of the system from the source of electrical potential. It will be aparent to those skilled in the art that our invention has a wide field of usefulness controlling wiring circuits in installations for various purposes. Since our invention is applicable with outstanding advantages to aircraft, we shall, for the purpose of this specification, but without implying any limitation, direct our disclosure to a wiring system for aircraft.

Since in the forced landing of an aircraft fuel lines may be jarred loose or broken and fuel tanks ruptured, the possibility of fire is often more of a hazard than the physical forces engendered in the impact. Because of such fuel hazard, it is common practice to dump the fuel supply in flight preparatory to making a forced landing. One reason such a precaution is not always effective to eliminate the fire risk completely is that dumping of the fuel is never so thorough but that residual quantities of fuel and inflammable fuel vapor remain in the fuel system. Another reason that fuel dumping does not preclude fire hazard is that in the normal operation of an aircraft, stray fuel vapors may form in protected spaces adjacent the fuel system, these incidental fuel vapors becoming significant only when impact forces strain or damage protecting walls.

The sparks that ignite fires under such conditions may be generated by friction, but it is believed that such sparks more often are to be attributed to the electrical system of the aircraft. In addition to dumping his fuel supply, an aircraft pilot may take the further precaution of turning off his ignition switch prior to a forced landing or crash, but such an expedient is of limited effectiveness for several reasons. In the first place, throwing the ignition switch affects only the ignition system and does not de-energize any electrically charged wires or other conducting members in other circuits, such as lighting circuits and circuits for instruments, which are ordinarily connected to a storage battery as a source of electrical energy. In the second place, the force of impact in landing may bring the poles of the electromotive source, or the live leads in the vicinity thereof, into contact with metal parts of the aircraft structure to make possib'e short-circuiting at points of fire hazards remote from any part of the normal electrical system. This latter possibility is favored by the fact that batteries may be torn from their moorings in landings of unusual severity. Even normal servicing of batteries when an aircraft is on the ground involves a certain fire risk, since the manipulation of battery leads may cause sparks in the presence of inflammable vapors.

With these potential hazards in mind, we have the general object in the present invention of providing means for completely de-energizing the wiring system of an aircraft. In the preferred form of our invention, it is our purpose to isolate the battery means of the aircraft not only electrically but also physically. We contemplate sealing off and ventilating the battery to an extent at least effective for minimizing the possibility of fuel vapors reaching the isolated battery. In this regard, one feature of our invention is the arrangement for operating a circuit-breaking means in conjunction with means for the physical isolation of the battery.

A further object of our invention is to provide an efficient and foolproof means for quickly connecting and disconnecting battery and generator terminals from a remote control point. A feature of our invention in this respect is an arrangement that precludes access to the battery until it is cut off from its associated circuit leads.

Other objects and advantages of our invention will be apparent in the detailed description to follow, considered with the accompanying drawings.

In the drawings:

Fig. 1 is a perspective view of a battery casing incorporating our invention, a remote control means cooperative therewith being shown diagrammatically;

Fig. 2 is a vertical section through a portion of the battery casing showing one of our switch assemblies in side elevation;

Fig. 3 is a section taken along the irregular line 3—3 of Fig. 2 to show the switch assembly in front elevation;

Fig. 4 is a section through the battery casing taken along the irregular line 4—4 of Fig. 2 to show the switch assembly in plan view;

Fig. 5 is a side elevation of a battery casing equipped with lid-latching means interlocked with the switch means;

Fig. 6 is a diagrammatic view of our invention as applied to the control of both battery and generator means;

Fig. 7 is a diagrammatic view in perspective of our system in the most advanced form arranged for simultaneous control of battery and generator switches; and Fig. 8 is a fragmentary side elevation of the battery casing of Fig. 7, the view being taken as indicated by the line 8—8 of Fig. 7.

Fig. 1 shows a battery casing, generally designated 10, that is to be incorporated in the structure of an aircraft in any suitable manner to become an integral and shock-resistant portion thereof. In the form of our invention chosen for illustration, the battery casing comprises a box-like body 11 and a removable cover 12. The cover is of sheet metal formed with a channel 13 around its edge to rest upon the rim of the casing body, the channel by preference containing a strip 14 of rubber or other resilient and acid-proof material to provide a substantially airtight seal. For reinforcement, the cover is provided with sheet metal channels 15 in one transverse direction and two pairs of spaced angles 16 in a second transverse direction resting on the channels 13 and 15 and extending beyond the edges of the cover 12 to overhang the body of the casing. The box may also be made of non-metallic material. When made of metal which is subject to action by acids and acid fumes, it must be rendered acid-proof by the addition of a coating of acid-proof paint, rubber, or similar material.

At their outer ends each of the pairs of angles 16 carries a block 17 of suitable material such as wood or synthetic plastic, there being four such blocks with bores to receive upright complementary bolts 18 mounted on the body of the casing. The bolts may be mounted on the casing body in any suitable manner. For example, as shown in the drawings, they may be mounted in blocks 21 of suitable material such as wood or synthetic plastic, each block being anchored to a pair of spaced angle clips 22 by suitable pins or rivets 23. Thumb screws 24 threaded onto the upper end of the bolts 18 normally press against the upper surfaces of the blocks 17 to clamp the cover 12 with substantial pressure against the sealing strip 14.

The particular casing shown in the drawings is designed to hold two batteries B snugly, any suitable means being employed to hold the batteries immovable in the casing. In the preferred form of our invention, we construct the casing with a lining 25 of rubber or other suitable resilient acid-proof and insulating material, the lining extending up to the rim of the box. The rim may be reinforced by a sheet metal angle 26 and a light sheet metal channel 27 that fits over the upper edges of both the lining 25 and the angle 26 as well as the intervening metal of the casing body. In addition to lining the box portion of the casing, we also contemplate providing layers 28 of similar material to line the cover 12, at least in the vicinities of the battery poles. Preferably a pair of ventilation ducts 29 is connected to the battery casing to provide for forced air circulation therethrough.

Since two batteries with two poles each are to be housed in the casing 10, and since we contemplate cutting the circuits at each of the battery poles, we provide the casing body with four switch housings 30 which may be constructed of sheet metal and removably attached to the casing in any suitable manner. Each of the switch housings has an outwardly inclined front wall 33, an arcuate top wall 34, two side walls 35, a bottom wall 36, and a plate 37 of insulating material mounted on the face of the battery casing in the area defined by these walls.

Secured on the plate 37 by screws 39 and nuts 40 is a pair of angle members 43 to serve as a bracket for the pivotal mounting of a switch lever generally designated 44. At the lower end of the switch lever is a block 45 of suitable insulating material, preferably a synthetic plastic that is rotatably carried by a suitable bolt 46 mounted in the two angle members 43. At the upper end of the switch lever 44 is a flat switch blade of suitable conducting material cut in angular configuration to provide an inwardly extending arm 48 and a shank portion 49, the shank portion extending into a slot in the block 45 and being attached to the block 45 by suitable bolt means 50. The switch lever 44 pivots between an outer open-circuit position and an inner closed-circuit position.

At the inner closed-circuit position the arm 48 of the switch lever extends through an aperture 51 in the wall of the battery casing into engagement with a suitable terminal clip 52 constituting a pole of one of the batteries B. The terminal clip 52 may comprise, for example, a strip of suitable conducting material of appreciable flexibility formed to provide a yielding slot to receive the arm of the switch blade, the terminal clip being attached by a suitable screw 53 to a metal bracket 54 that is in turn attached to the battery B by suitable screw means 55. Also at the closed position of the switch lever, the shank 49 of the switch blade engages a second terminal clip 57 mounted on the insulating plate 37 in the switch housing 30, this second clip being of similar construction to the clip 52 and providing a similar yielding slot. This second clip 57 is electrically connected with an adjacent member 58 of angular configuration riveted to the plate 37.

The switch housing 30 is provided with an aperture 59 in which is mounted an insulating bushing 60. A wire 61 or lead from the aircraft wiring system extends through the bushing 60 and ends inside the switch housing in a terminal member 62 that is connected to the angular member 58 by a suitable screw 63 and nut 64.

It is apparent that at the closed position of the switch lever 44 electrical connection between the battery B and the wire 61 is provided through the arm 48 and the shank 49 of the switch blade.

While the switch may be actuated in any manner in its opening movement, we prefer to provide suitable yielding means to be released in an emergency for effecting such movement. To cooperate with such yielding means, we provide a yoke 65 which may be made of sheet metal bent to form two legs 67 and flanges 69 by means of which the yoke is riveted to the insulating plate 37. A pair of spaced arcuate guide arms 70 of curvature concentric to the pivot of the switch lever 44 have their inner ends mounted on the plate 37 and their outer ends secured by screws 71 to the yoke 65. The switch lever 44 carries a cross member 72, which may be a strip of metal fixed to the shank portion 49 of the switch blade, the strip of metal having two apertures 73 each of which surrounds one of the guide arms 70. A pair of helical expansile springs 75 embraces the guide arms 70 respectively in compression between the cross member 72 of the switch lever and the insulating plate 37, the springs tending to urge the switch lever toward its open circuit position.

For closing the switch in opposition to the springs 75, we provide an arcuate handle 76 of insulating material mounted by screws 77 on the blade of the switch lever, an aperture 78 being provided in the front wall 33 of the switch housing to permit the handle to protrude from the housing when the switch is in open position. Since the handle 76 is concentric to the pivot of the switch lever, the aperture need provide but little clearance for the switch handle.

To hold each of the switch levers in closed position in opposition to the force exerted by the springs 75, we contemplate providing remotely controlled latch means. For this purpose we mount on the inner face of one of the side walls of each switch housing a latch bracket 79 on which is pivotally mounted a latch arm 80 having a head 81 adapted to enter a latch recess 82 in the handle 76, thereby engaging the handle and holding the switch lever in circuit-closing position. The latch arm 80 is normally pressed into latching position by a helical spring 84 that embraces and is retained by a tubular member 85 mounted in the base of the bracket 79, there being clearance between the end of the tubular member and the latch arm to permit releasing movement of the latch arm. The means for releasing the latch may include a leaf spring 86 mounted on the side of the switch housing 30, the free end of the leaf spring extending above the housing. Extending inwardly from the leaf spring through the side wall of the housing and through the tubular member 85 is a suitable pin 87 that is attached at its inner end to the latch arm 80.

The four leaf springs 86 corresponding to the four switches associated with the battery casing are to be operated, preferably simultaneously, by some remote control means, such as, for example, a control lever 90. To provide for operation by such a lever, the four leaf springs 86 may be interconnected by a cable 91 that passes over a pair of pulleys 92 mounted on brackets 93 at two corners of the battery casing. The cable 91 is connected at its mid-point to a control cable 94 that may pass around various pulleys 95 and 96 and terminate in an operating connection with the lever 90.

The operation of my safety device may be readily understood from the foregoing description. The four switch levers in the four switch housings 30 are normally held in circuit-closing disposition by the latch arrangement described.

To de-energize the entire wiring system, it is necessary merely to throw the lever 90. In an emergency, the pilot or one of the operators of the aircraft throws the lever 90 thereby completely disconnecting the battery current from all battery circuits. Operative movement of the lever 90 acting on the cables 94 and 91 causes each of the leaf springs 86 to be deflected, thereby releasing the latch mechanism associated with each of the switch levers, whereupon the springs 75 force the levers outward, the springs expanding until the cross member 72 of each switch lever is pressed against the yoke 65. The outward movement of the switch levers completely withdraws each of the associated switch arms 48 from the interior of the battery casing and simultaneously breaks the contact between the shank portion of the switch blade and the associated terminal clip 57. A feature of the described arrangement is that the switch handles 76 serve as visible indicators to denote the dispositions of the associated switch mechanisms. For greater prominence the switch handles may be painted some distinctive color.

It is to be noted that any arcs formed in the switch operation will be entirely enclosed and separated from any fuel vapors that may exist around the exterior of the battery casing. After the various switches are open, fuel vapors to reach the interior of the battery casing must not only find their way into the switch housing 30 but also pass from the interior of the switch housing through the aperture 51. It will be noted that the switch handle 76 occupying the aperture 78 at all times blocks to a material extent any such inflow. The rubber lining of the casing not only provides insulating protection but also tends to absorb shocks and to protect the metal of the casing from impact by the enclosed batteries.

To restore the circuits, the various switch mechanisms may be returned to their normal latched dispositions by merely pressing inwardly on the ends of the switch handles 76 until the handles are engaged by the associated latches.

A further refinement for incorporation in the preferred form of my invention provides latch means for preventing removal of the lid from the battery casing until after all the battery terminals are disconnected. Such an arrangement precludes the possibility of anyone inadvertently removing the casing lid before opening the various switches. When the lid is off the casing, stray vapors are free to envelop the exposed battery terminals and may be ignited by sparking incidental to the opening of circuits at the battery terminals. A further reason for having the battery terminals disconnected whenever the lid is removed is that the possibility of a workman's tool accidentally causing short circuits is considerably reduced.

The manner in which this feature may be added to the invention may be understood by reference to Fig. 5 in which corresponding numbers are employed to indicate parts heretofore described. The particular latch means shown in this figure is provided by a relatively simple means, namely, a latch finger 100 mounted by suitable screw means 101 on the outer end of the switch handle 76. When the various switches are closed, each of these latch fingers 100 is automatically shifted inwardly into engagement with the lid 12 of the casing so that even with the thumb nuts 24 removed, the lid may not be lifted from the casing. When the various switches are opened, however, the latch fingers 100 are carried to the positions shown in dotted lines in Fig. 5, in which positions the fingers are spaced from the lid sufficiently to avoid interference with the procedure of removing the lid. The lid may then be lifted from the casing, as indicated by the upper dotted lines in Fig. 5.

While our invention is described above as utilized solely for the control of battery connections, it is to be understood that in installations having a generator as well as a battery, the control system will be extended to switch means for the generator terminals. Fig. 6 depicts diagrammatically a wiring system in which a generator 103, a battery 104, and various energized means represented by lamps 105 are connected in parallel. The main leads 106 and 107 for energizing the various circuits of the wiring system are connected through a pair of switches 108 to the terminals of the battery 104 and in a similar manner are connected through a pair of switches 109 to the terminals of the generator 103. These switches 108 and 109 are constructed in accordance with the teaching above and may be normally latched against the tendency of suitable springs 110 to open the switches. The usual automatic cutout 111 is inserted between the generator and the battery.

A manually operable master control means, for example, a lever 112 pivoted at 113, operates a master cable 114 that passes around various sheaves 115. Branching from the master cable 115 are two cables 116 that pass around sheaves 117. The cables 116 are connected with the battery switches 108 respectively through cables 118 that pass around sheaves 119, and are connected with the generator switches 109 respectively through cables 120 that pass around sheaves 122. Whenever the lever 112 is operated to open all of the switches 108 and 109, both the battery and the generator are electrically isolated from the wiring system.

In Figs. 7 and 8 showing the most advanced form of our control system, previously recited numerals are employed to designate previously described parts. An outstanding feature of this form of our invention is the fact that the remote control lever 125 shown in a neutral position in Fig. 7 may be rotated clockwise to open simultaneously the switches associated with the battery casing 126 and generator 127, or may be shifted in the counter-clockwise direction to restore the various switches to closed position. This arrangement not only dispenses with the necessity of closing the switches individually by hand, but also makes it possible for a pilot in the course of flight to restore the various circuits for normal operation instantly should it be desirable to do so after the circuits have been cut off in an emergency. In the particular embodiment of our invention shown in Fig. 7 a cable 129 leading from the control lever 125 divides into two branches 130 and 131 that are connected to the previously mentioned leaf springs 86 for opening the switches of the battery and generator in the manner previously described with reference to Figs. 1 and 6.

From the other side of the control lever 125 a cable 133 divides into two cables 135 that pass around various pulleys 136. Each of the cables 135 is connected through a cable fitting 137 with a branch cable 138 for restoring the switches of the battery casing 126 and a branch cable 139 for restoring the switches of the generator 127. Preferably, a coil spring 140 is incorporated in each of the cables 135 and a coil spring 141 is incorporated in each of the cables 139 to avoid the necessity of close adjustment in the relative lengths of the cables and to reduce the possibility of the mechanism getting out of adjustment by reason of stretch in the various cables.

The manner in which the cables 138 and 139 are adapted to close the corresponding switches may be best understood by reference to Fig. 8 showing one of the switch housings 30 on the battery casing 126. Integral with the switch lever 44 is a switch-closing arm 143 that operatively extends through a slot 144 in the switch housing 30. The cable 138 for operating the switch-closing arm 143 is attached to the outer end thereof and passes upwardly over a suitable pulley 145 mounted on a bracket 146 that extends upwardly from the switch housing. In the same manner each of the cables 139 extends over a pulley 145 into operative connection with a corresponding switch-closing arm 143 associated with the generator 127.

It will be apparent to those skilled in the art that other types of latches and other remote control arrangements may be employed and that within our broad concept no latch whatsoever is necessary. It is apparent that a wide range of changes and modifications that do not depart from the essence of our invention will occur to those skilled in the art. We reserve the right to all such changes and modifications that properly fall within the scope of our claims.

We claim as our invention:

1. In an electric system having a source of electromotive force and a wiring system connected with said source, the combination therewith of: a casing enclosing said source, said casing having at least one switch aperture; switch means retractably extending into said casing through said aperture or apertures to electrically interconnect said source and wiring system; and means to retract said switch means from the casing, thereby leaving said source isolated both physically and electrically from said wiring system.

2. In an electric system, the combination of: a source of electromotive force; contact means electrically connected with said source; a casing enclosing said source and contact means; wiring outside said casing to be energized by said source; a contact means outside of said casing electrically connected with said wiring; and a switch member movable between a position at which it extends into said casing and interconnects said contacts and a second position completely outside said casing and spaced from both said contacts.

3. In an electric system having battery means and a wiring system connected with the battery means, the combination therewith of: a battery casing enclosing said battery means to substantially seal said battery means, said casing having a switch aperture; a normally closed switch means mounted exterior of said casing for interconnecting said battery and wiring system, said switch means being connected with said wiring system and normally retractably extending through said aperture into electrical connection with said battery; a means enclosing said switch means; yielding means urging said switch means into retracted circuit-opening disposition to electrically isolate said battery; latch means to hold said switch means in circuit-closing position; and remotely controlled means to release said latch to permit said yielding means to actuate the switch means.

4. In an electric system having a source of electromotive force and a wiring system connected with the source, the combination therewith of: a casing enclosing said source to substantially seal said source; a closure member for said casing movably mounted thereon for access to said source; normally closed switch means for cutting off all connections between said wiring system and said source to isolate said source electrically; and a latch to hold said closure member in closed position, said latch being interlocked with said switch means to prevent opening of said closure member when said switch means is closed.

5. In an electric system having a source of electromotive force and a wiring system connected with said source, the combination therewith of: a casing enclosing said source to substantially seal said source; a closure member for said casing movably mounted thereon for access to said source; normally closed switch means for cutting off all connections between said wiring system and said source to isolate said source electrically; and a latch operatively connected with said switch means to move from an ineffective position when said switch means is open to an effective position when said switch means is closed, and vice versa, said latch means at its effective position engaging said closure member to prevent opening movement thereof.

6. In an electrical system of the character described, the combination of: a source of electromotive force; a casing enclosing said source, said casing having an aperture; a switch means movable between a retracted open position exterior of said casing and a closed position in electrical communication with said source through said aperture; a second casing enclosing said switch means and aperture; and remote control means for actuating said switch means.

7. In an electrical system of the character described, the combination of: a source of electromotive force; a casing enclosing said source, said casing having an aperture; a switch means movable between a retracted open position exterior of said casing and a closed position in electrical communication with said source through said aperture; yielding means to move said switch means from said closed position to said retracted open position; latch means to hold said switch means in a closed position in opposition to said yielding means; a second casing enclosing said switch means and aperture; and an emergency control adapted to release said latch means.

8. In an electric system for structures subject to violent stresses due to collision or the like, the combination of: a source of electromotive power; a casing enclosing said source to substantially seal the same from said structure; a wiring system extending externally from said casing; normally closed switch means within said casing for breaking all connections between said source and the portion of said wiring system extending externally of said casing; and control means remote from said casing for opening said switch means to break said connections and isolate said source both physically and electrically from said portion of said wiring system.

9. In an electric system for structures subject to violent stresses due to collision or the like, the combination of: a source of electromotive force; a casing enclosing said source to substantially seal the same from said structure; a wiring system extending externally from said casing; normally closed switch means within said casing for breaking all connections between said source and the portion of said wiring system extending externally of said casing; means resiliently urging said switch means to open position to break said connections; holding means for retaining said switch means in closed position; and control means remote from said casing for releasing said holding means for causing said switch means to open to break said connections and isolate said source both physically and electrically from said portion of said wiring system.

10. In an electric system for structures subject to violent stresses due to collision or the like, the combination of: a source of electromotive force; a casing enclosing said source to substantially seal the same from said structure; a wiring system extending externally from said casing; normally closed switch means within said casing for breaking all connections between said source and the portion of said wiring system extending externally of said casing; means resiliently urging said switch means to open position to break said connections; holding means for retaining said switch means in closed position; control means remote from said casing for releasing said holding means for causing said switch means to open to break said connections and isolate said source both physically and electrically from said portion of said wiring system; and remotely controlled means for restoring said switch means to closed position.

HOWARD R. HUGHES.
RICHARD W. PALMER.
WILLIAM L. LEWIS.